United States Patent [19]

Ginzburg

[11] Patent Number: 4,595,358
[45] Date of Patent: Jun. 17, 1986

[54] RE-RADIATING HEAT SHIELD

[75] Inventor: Vladimir B. Ginzburg, Pittsburgh, Pa.

[73] Assignees: Wean United, Inc.; International Rolling Mill Consultant, Inc., both of Pittsburgh, Pa.

[21] Appl. No.: 727,959

[22] Filed: Apr. 26, 1985

[51] Int. Cl.⁴ .................. F27D 7/00; F27D 23/00; F28F 13/00
[52] U.S. Cl. .................. 432/65; 165/136; 432/249
[58] Field of Search .......... 432/65, 249; 165/135, 165/136

[56] References Cited
U.S. PATENT DOCUMENTS 2,637,530 5/1953 Janos .................. 165/136
4,411,621 10/1983 Miller .................. 432/247
4,452,587 6/1984 Laws et al. .................. 432/65

Primary Examiner—John J. Camby
Attorney, Agent, or Firm—Daniel Patch

[57] ABSTRACT

A refractory block design for re-radiating a substantial amount of heat losses back to a heated product thereby substantially maintaining its required temperature. A relatively thin sheet of stainless steel, i.e. the ratio of the thickness of the sheet being approximately 1/500th of the thickness of the heated product, is wrapped in a sinuous manner around one side of a refractory fiber block arranged in a similar sinuous manner to tightly fit into the folds of the block for storing heat, and radiating heat back to the heated product when thermal equilibrium therebetween is reached.

12 Claims, 2 Drawing Figures

RE-RADIATING HEAT SHIELD

BACKGROUND OF THE PRESENT INVENTION

The present invention relates to heat shields and it is concerned particularly, but not exclusively, with heat shields for use in metal processing.

For instance, in the processing of a hot steel strip in a rolling mill, a hot product is taken through several working stages to produce a finished strip. The metallurgical qualities and gauge of the finished strip are closely related to the accurate control of the temperature of the material during the hot rolling process. However, due to heat losses occurring through radiation and convection it is extremely difficult to control the temperature through its various working stages which may require some time delay between stages thereby resulting in the product not having its required rolling and finishing temperatures.

Attempts in various forms, such as aluminum reflectors or heat insulating panels located along the delay table of a finishing mill have been used to reduce the heat losses from the surfaces of a hot product. These attempts have serious limitations which as to the reflectors are discussed in the background portion of Laws, U.S. Pat. No. 4,463,585, which is referred to herein for providing additional background information for a better understanding of the present invention.

As mentioned in this '585 patent, one type of heat insulating panel has a heat insulating core and a flat cover plate forming a main face of the panel; and as disclosed in this same patent, another type of heat insulating panel provides for relative thermal expansion of a thin, flat plate with respect to the core. In both types, the entire outer surface of the plate is directly exposed to the heated object and the plate is backed up by insulation. Also, both types are adapted so that the thin flat plates are temperature resistant material which absorb and then radiate heat back to the heated object or product. It is mandatory that the plate's dimension be such as to provide sufficient effective heat emissivity of its surface without melting and its temperature be able to quickly rise to closely approach the temperature of the product to re-radiate the heat and reach thermal equilibrium with the product.

It is therefore an object of the present invention to provide a re-radiating heat shield having a surface area with a substantially high heat emissivity and thermal capacity substantially equivalent to the panels of the present designs however commencing to re-radiate heat and approach thermal equilibrium with the heated product in a much quicker period of time with a less temperature drop in the heated product compared to the panels of the present designs.

It is a further object of the present invention to provide a heat shield for re-radiating heat comprising thermal insulating material having a number of closely adjacent co-extending sections provided with one or more holding surfaces formed by said adjacent sections, thermal absorbing material having a portion directly exposable to a heat source which portion includes a series of relatively short co-extending surfaces, said thermal absorbing material also including for each said short surface a substantially co-extending longer surface arranged not to be directly exposed to said heat source, said longer surfaces of said thermal absorbing material arranged to enwrap at least a portion of a different one of said co-extending sections of said thermal insulating material and restrained by said holding surfaces of two adjacent sections of said insulating material, wherein the nature and thermal mass of said thermal absorbing material and the nature and relationship of said thermal insulating material relative thereto greatly increases the re-radiating thermal characteristics of said thermal absorbing material.

More particularly, the present invention provides a design for a re-radiating panel having a sheet of refractory fiber material arranged in a sinuous manner to form a block, and a relatively thin sheet of heat storing material such as stainless steel arranged adjacent to the sides of the fiber sheet such that it conforms to the fiber sheet's sinuous configuration with portions of the stainless steel sheet doubling over into folds and which folds fit tightly in the folds of the fiber block for support and strengthed thereby and where heat is stored and other relatively shorter portions of the stainless steel sheet being exposed to the atmosphere.

DETAILED DESCRIPTION OF THE PREFERRED EMBODIMENTS

Figure 1:
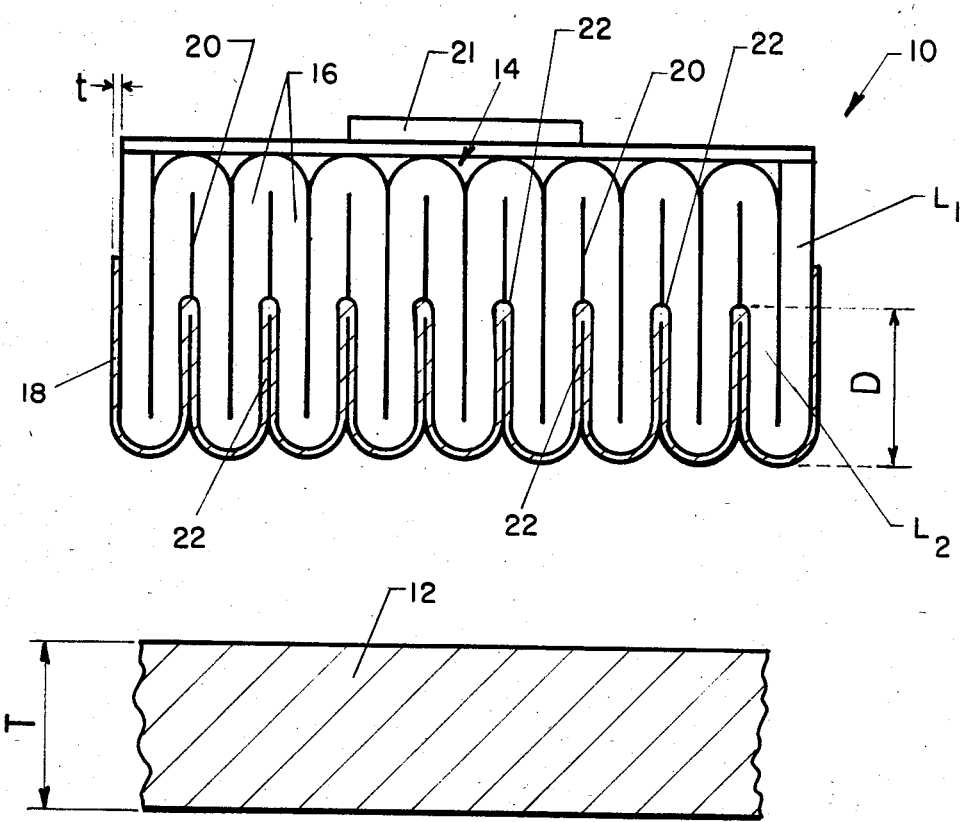
FIG. 1 is a schematic of a first embodiment of the present invention positioned above a heated product.

Referring first to FIG. 1, there is shown a heat re-radiating panel 10 of the present invention. This panel 10 may be substituted for the panels with slight modifications as those disclosed in U.S. Pat. Nos. 4,343,168 and 4,463,585; the latter patent being previously mentioned, or may be used for a lining of a sidewall or roof of a furnace or of some other high temperature equipment such as hot strip coilers now being employed in front of the finishing stand of a hot strip mill. For explanation purposes herein panel 10 will be discussed with reference to a delay table between a roughing train and a finishing train of a hot strip mill.

Below re-radiating panel 10 is a hot transfer bar 12 supportable by the delay table and having a temperature of approximately 2000° F., which may be either steel or aluminum, and whose thickness is designated as T.

Panel or block 10 comprises an insulating blanket 14 made of refractory fibrous materials, such as chromia-alumina-silica, alumina-silica compositions and zirconia compositions which materials have the ability to withstand high temperatures. Block 10 is preformed by folding insulating blanket 14 in a sinuous manner to form a plurality of even length adjacent layers 16. Details of its construction and operation of such a ceramic insulating blanket 14 and its particular mounting features which may be used in the present invention are further disclosed in Byrd, Jr. U.S. Pat. Nos. 4,001,996 and 4,123,886 which are incorporated herein by reference.

Wrapped around the curves of adjacent layers 16 on the side of block 10 facing toward transfer bar 12 is an extremely thin sheet 18 of ferrous material having the characteristics to both resist high temperatures and to retain heat; for example, stainless steel. Naturally, the thermal capacity of the stainless steel sheet is proportional to its thickness t indicated on the left hand side in the Figure. Thickness t of sheet 18 would have a substantially smaller dimension than the thickness T of transfer bar 12. Ideally, this ratio being 1 to 500 or greater, that is, the thickness of sheet 18 would be approximately 1/500th or less of the thickness of transfer bar 12. This ratio permits the heat from bar 12 to sheet 18 to be quickly transferred by radiation and convection, more about which will be discussed shortly.

Sheet 18 extends around the outer edges of block and wraps around and adheres to the layers 16 to fit a distance D into the folds 20 of each adjacent layer 16 and to create an effective re-radiating area around the curved sections of two adjacent layers L1, L2 of blanket 14 which re-radiating area is exposed to the atmosphere and as FIG. 1 shows directly above transfer bar 12. The sheet's adherence to the surfaces of blanket 14 is done through any suitable means, preferably an adhesive substance. Folds or double layers 22 of stainless steel sheet 18 act as heat accumulators, more about which will be discussed shortly.

In packaging and installation, block 10 is normally held together through bands (not shown) which wrap around block 10 with sheet 18. Thereafter, these bands are removed, whereby upon the transfer of heat from transfer bar 12, each layer 16 expands toward its adjacent layer 16 to snugly and securely hold fold portions 22 of stainless steel sheet 18 in folds 20. This holding aspect is augmented, as noted earlier, by the curved form of the sections of the exposed portions of the sheet 18 and by the folds of the sheet fitting tightly in the folds of the fiber block. Block 10 is secured in place by its mounting member 21 through suitable means to an overhang member (not shown).

The greater the ratio of bar thickness T to sheet thickness t, the less heat is required to heat the sheet 18, and therefore, since heating is a function of time, the quicker stainless steel sheet is able to return the heat to transfer bar 12. The heat from bar 12 is transferred into sheet 18 by radiation and convection and this heat in turn is conveyed by conduction into folds 22 of stainless steel sheet 18. The amount of heat stored in folds 22 of sheet 18 in addition to its thickness depends upon its total length sinuously wrapped around block 10, and naturally, the thermal efficiency of insulating blanket 14.

Also, it is important to note the substantial greater length D of the heat storable surfaces of the folds 22 as compared with the much shorter exposed surfaces of the sheet 18, which ratio in its illustrated form is somewhat greater than 2 to 1, and which may be as high as 10 to 1, and may exceed 5 to 1 in certain applications.

In use, a transfer bar 12 having a temperature of approximately 1900° F. is caused to travel adjacent to the outer face of re-radiating block 10. Its front end will first cool at almost the same rate it would achieve if exposed to the atmosphere. Since sheet 18 is extremely thin, its temperature will quickly rise to closely approach the bar temperature at say 1800° F. with a drop of approximately 20° F. in bar temperature, all the while the heat being conducted into folds 22 of sheet 18.

The relationship between the amount of heat used for re-radiation and the amount of heat accumulated in the folds will be determined as a function of temperature and the geometry of transfer bar and the time delay between sequential bars. This relationship can be estimated by providing a predetermined depth D of folds 22 of stainless steel sheet 18.

Figure 2:
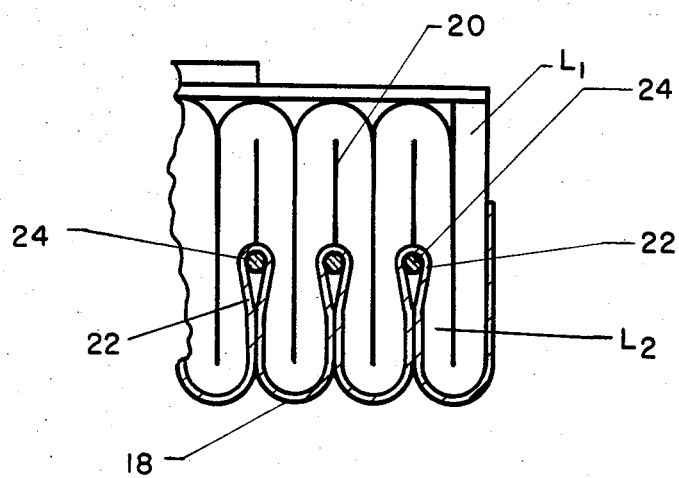
FIG. 2 is a partial schematic of a second embodiment of the present invention.

A still higher degree of heat can be retained in folds 20 by providing rod-like electrical heating elements 24, embedded in sheet folds 22 as shown in FIG. 2. These elements 24 are one of several well known types and may be used when the time delay between subsequent transfer bars is excessive or the ratio of the thickness of bar 12 to the thickness of sheet 18, is relatively small, i.e. more time is needed for the sheet to heat up initially due to the fact that the transfer bar is radiating heat to the sheet at a slower rate of speed than if the thickness of the bar were greater.

Since heat loss into sheet 18 is minimized by the thermally insulating blanket 14, the emissive area of sheet 18 almost immediately begins to re-radiate heat and approach thermal equilibrium with bar 12 somewhere in the range of 1700° to 2000° F. During gap time between bars, the excessive heat stored in folds 22 of sheet 18 will be transferred to those portions exposed to bar 12. Therefore, when the bar 12 exits from under re-radiating block 10, those portions of sheet 18 exposed to bar 12 remain at substantially the same previously attained equilibrium temperature for a much longer period of time compared to the thicker flat plate construction of the present designs identified above, which means that when the next hot bar comes under heat shield 10, a shorter length of its leading end will cool than that of the previous bar since heat is still retained in the effective radiating area of heat shield 10.

Heat is re-radiated from sheet 18 to the new bar, and thermal equilibrium between sheet 18 and the new bar is attained much more quickly than what occurred in the previous transfer bar which was positioned under heat shield when it was cold. Minimizing the time delay between sequential transfer bars positioned beneath heat shield can obtain a constant equilibrium temperature between bar 12 and sheet 18. The present invention also allows a time delay between sequential transfer bars to be extended for a longer period of time than what is permissible with the heat shields of the present designs with either the same or greater amount of heat re-radiating efficiency.

The present invention has been discussed in the embodiment where a heat shield arrangement is located above the transfer bar; however, it is to be understood that in accordance with the teachings of the aforesaid patents, that such a heat shield arrangement can have panels disposed below the path of transfer bar, or that a heat shield panel can be disposed both above and below the transfer bar's path of travel; or there may be other embodiments and uses which fall within the spirit and scope of the present invention as defined by the following claims.

In accordance with the provisions of the patent statutes, I have explained the principle and operation of my invention and have illustrated and described what I consider to be the best embodiment thereof.

I claim:

1. A heat shield for re-radiating heat, comprising:
thermal insulating material means having a number of closely adjacent co-extending sections provided with one or more holding surfaces formed by said adjacent sections, and
thermal absorbing material means having a fast heat up characteristic and having a portion directly exposable to a heat source,
said thermal absorbing material means also including for said exposable surface a substantially co-extending non-exposable surface,
said exposable and non-exposable surfaces of said thermal absorbing material means arranged to form a closely adjacent receptacle for receiving a different one of said co-extending sections of said thermal insulating material means, said thermal absorbing material means being in the form of a flat sheet-like material having a thickness that requires assistance to hold a predetermined operative shape for said exposable surfaces,
said assistance consisting of the predetermined form being such that it takes a shape which will give inherent support to the exposable surfaces,
wherein said non-exposable surfaces of said thermal absorbing material means has contacting surfaces for supporting associated exposable surfaces, and further wherein said thermal insulating material means has a supporting relationship with an adjacent portion of said exposable surfaces of said thermal absorbing material means.

2. In a heat shield according to claim 1, wherein said thermal absorbing material means takes the form of a series of adjacent co-extending receptacles for each of said co-extending sections of said insulating material means, in which said sections are received in one of said receptacles.

3. In a heat shield according to claim 1, wherein the insulating material means employed for said thermal insulating material means and its sectionalized construction creates a highly efficient thermal insulating assembly.

4. In a heat shield according to claim 1, wherein said thermal absorbing material means has a relatively low thermal capacity and said exposed surfaces of said thermal absorbing material means are at least less than one half the corresponding length of said longer surfaces thereof.

5. In a heat shield according to claim 1, wherein said heat source is a pre-heated workpiece arranged to heat said heat shield, which heat is then re-radiated back to said workpiece or to a substitute workpiece, and
wherein said thermal absorbing material means is relatively thin compared to the thickness of said workpiece and is of a material means that performs as a transitory heat sink capable of rapidly reaching thermal equilibrium with said heated workpiece.

6. In a heat shield according to claim 5, wherein said comparison of thickness of said workpiece to said thermal absorbing material is greater than 100 to 1.

7. In a heat shield according to claim 1, further comprising heating means arranged between and carried by at least some of said sections of said insulating material means arranged to import heat to said thermal absorbing material means.

8. In a heat shield according to claim 1, wherein said exposed surfaces of said thermal absorbing material means have relatively poor heat reflecting properties.

9. A heat shield according to claim 1, wherein said holding surfaces of said insulating material means extends in a direction away from said heat source.

10. A heat shield for re-radiating heat comprising:
thermal insulating material having a number of closely adjacent co-extending sections provided with one or more holding surfaces formed by said adjacent sections, and
thermal absorbing material having a fast heat up characteristic and having a portion directly exposable to a heat source which portion includes a series of relatively short co-extending surfaces,
said thermal absorbing material also including for each said short surface a substantially co-extending longer surface arranged not to be directly exposed to said heat source,
said longer surfaces of said thermal absorbing material arranged to enwrap at least a portion of a different one of said co-extending sections of said thermal insulating material and restrained by said holding surfaces of two adjacent sections of said insulating material,
wherein the nature and thermal mass of said thermal absorbing material and the nature and relationship of said thermal insulating material relative thereto greatly increases the re-radiating thermal characteristics of said thermal absorbing material.

11. In a heat shield according to claim 10, wherein said thermal absorbing material consists of a thin sheet of ferrous material having a high temperature capacity.

12. A heat shield for re-radiating heat, comprising:
a sheet of insulating fabric folded in a sinuous manner to create a plurality of folds of adjacent layers of fiber insulating material,
said adjacent layers of said insulating material constructed and arranged relative to their adjacent fold to closely bind said layers together into a panel, and
a continuous sheet of ferrous material having heat absorbing characteristics arranged at least along and against one outer surface of said sheet of insulating fabric in a corresponding sinuous manner such that portions of said ferrous material enwrap exposed areas of said folds of said insulating fabric and portions of said ferrous material fit tightly into said adjacent folds of said insulating fabric so as to be supported therein,
said ferrous material having a thickness such that said enwrapping of said ferrous material requires assistance to hold a predetermined operative shape, said assistance consisting of a predetermined form being such that it takes a shape which will give inherent support to said enwrapped ferrous material,
said exposed areas of said folds of said insulating fabric enwrapped by said ferrous material being exposed to a heat source in a manner said heat from said source is absorbed in said exposed areas of said folds and conducted and stored in said portions of said adjacent folds to quickly approach thermal equilibrium between said ferrous material and said heat source to re-radiate heat back to said heat source to maintain said heat source at a predetermined termperature.

* * * * *